United States Patent
Scherer et al.

[11] Patent Number: 6,019,440
[45] Date of Patent: Feb. 1, 2000

[54] PROCESS AND DEVICE FOR REGULATING A POWER BRAKE VARIABLE BOOSTING FACTOR

[75] Inventors: Peter Scherer, Weiterstedt; Jürgen Balz, Hünstedten-Oberlibbach; Martin Semsch, Darmstadt; Jürgen Böhm, Oberneisen; Karlheinz Bill, Dreieich, all of Germany

[73] Assignee: ITT Manufacturing Enterprises Inc., Wilmington, Del.

[21] Appl. No.: 08/945,335

[22] PCT Filed: Apr. 3, 1996

[86] PCT No.: PCT/EP96/01454

§ 371 Date: Jan. 26, 1998

§ 102(e) Date: Jan. 26, 1998

[87] PCT Pub. No.: WO96/34783

PCT Pub. Date: Nov. 7, 1996

[51] Int. Cl.⁷ ............................. B60T 13/72; B60T 13/66
[52] U.S. Cl. ...................... 303/114.3; 303/114.1
[58] Field of Search ................ 303/3, 14, 15, 303/20, 113.3, 113.5, 114.1, 114.3, 155

[56] References Cited

U.S. PATENT DOCUMENTS

| | | | |
|---|---|---|---|
| 4,743,072 | 5/1988 | Brearley | 303/15 |
| 4,812,777 | 3/1989 | Shivac | 303/14 |
| 5,372,409 | 12/1994 | Farr | 303/20 |
| 5,427,442 | 6/1995 | Herbel | 303/114.3 |
| 5,505,526 | 4/1996 | Michels | 303/3 |

FOREIGN PATENT DOCUMENTS

| | | |
|---|---|---|
| 0 616 932 | 9/1994 | European Pat. Off. |
| 40 34 847 | 5/1992 | Germany |
| 93/24353 | 12/1993 | WIPO |

*Primary Examiner*—Chris Schwartz
*Attorney, Agent, or Firm*—Rader, Fishman & Grauer PLLC

[57] ABSTRACT

A device and method of adjusting a variable boosting factor of a brake power booster is provided. A variable boosting factor is achieved by constructively defining a basic boosting factor of a brake power booster that may be overridden by electronic independent activation. In a preferred embodiment, the driver's pedal force is measured either directly at the brake pedal, or after the pedal force is boosted by the brake pedal on the piston rod of the brake power booster by means of a force. A nominal pressure specification is generated from this quantity by way of a variable amplifier and an electrical signal-adapting unit. The braking pressure which is produced from the driver's pedal force and the basic boosting factor of the brake power booster can be overridden by this independent activation.

8 Claims, 2 Drawing Sheets

PROCESS AND DEVICE FOR REGULATING A POWER BRAKE VARIABLE BOOSTING FACTOR

FIELD OF THE INVENTION

BACKGROUND OF THE INVENTION

The present invention relates to a device and a method of adjusting a variable boosting factor of a controlled, independently activatable brake power booster which boosts an input force and converts it into a deceleration of an automotive vehicle.

The boosting factor i, i.e. the ratio between input force and output force, is invariably adjusted in conventional brake power boosters. This factor is fixed in the development of the brake power booster within limits predefined by construction. The output force of the brake power booster acts upon a master brake cylinder and thereby generates a braking pressure which is virtually proportional to the output force, thus providing deceleration of the automotive vehicle.

A disadvantage of brake systems equipped with a brake power booster of this type is that the ratio between pedal force and automotive vehicle deceleration is not constant. The ratio is subject to variable parameters such as vehicle mass, coefficients of friction of linings, and rates of hydraulic efficiency. The driver must acclimate to these variations in the braking behavior. To relieve the driver, it is desirable to adapt the brake system so that a constant ratio between the pedal force of the driver and the vehicle deceleration can be adjusted. This necessitates a brake power booster with a variable boosting factor which permits compensating the influence of variable parameters also during operation.

Further, independently activatable brake power boosters are disclosed in the art, for example, in German patent application No. 43 24 688.5. This publication discloses a vacuum brake power booster wherein a third sealing seat on the poppet valve renders it possible to effect an independent assist braking operation irrespective of the activation by the driver.

SUMMARY OF THE INVENTION

An object of the present invention is to disclose a device and an appropriate method which permits operating a prior art brake power booster with a variable boosting factor.

According to the present invention, this object is achieved by a device including a force sensor for measuring the input force, a variable amplifier for amplifying the output signal of the force sensor by the boosting factor, and an electrical signal-adapting unit for generating a nominal pressure value from the output signal of the booster. It is favorable that the input and output quantities of the system are directly taken into account for the control so that inaccuracies in the system, a plurality of adding, clearance-induced quantities of mechanic components, etc., are taken into account automatically, without the necessity to know them in detail. The exact design of the brake power booster is of secondary importance because the controller controls only the output value, irrespective of how the value is adjusted. The pedal force is introduced into the brake power booster, on the one hand, directly as a mechanical input quantity which is boosted by the invariably predetermined boosting ratio of the brake power booster. On the other hand, the pedal force is introduced into the controller by way of the variable amplification of a nominal value. The result is that the pedal force is boosted at least by the invariably adjusted boosting ratio of the brake power booster, which is possibly overridden by the nominal pressure value on the controller that is amplified to a variably higher amount.

The brake power booster is independently activatable, i.e., irrespective of the pedal application and, thus, irrespective of the driver's wish. When the vacuum brake power booster has a slidable third sealing seat, as disclosed in German patent application No. 43 24 688.5, the solution disclosed, which founds on controlling the boosting factor, has the advantage (compared to an equally possible control of the brake power booster by adjusting the position of the third sealing seat in relation to the control housing) that neither an extremely high accuracy of positioning of the third sealing seat nor an additional sensor means for determining the travel of the third sealing seat in relation to the control housing is required.

The method according to the present invention of adjusting a variable boosting factor of a controlled, independently activatable brake power booster includes the following method steps:

an input force is converted by the brake power booster into a boosted output quantity, the output quantity is compared with a nominal value, a controller determines a corrective signal from this information, the corrective signal defines the magnitude of the independent activation of the brake power booster, the magnitude of the input force is continuously measured, the measured quantity is amplified by a variable boosting factor, the amplified signal is subjected to a control adaption, and the adapted signal is conducted as a nominal value to the controller.

This method may be used for all applications requiring adjustment of the boosting factor of the brake power booster by superimposed controller structures because it permits controlling the boosting factor according to such a preset standard. The boosting factor is defined as the ratio between the input force and output force of the brake power booster. The output force is converted into hydraulic brake pressure, for example, by way of a tandem master cylinder, or generally into deceleration of the vehicle. Therefore, the limits of the system may be extended for a concept of variable boosting so that the relation between the input force of the brake power booster and the produced deceleration or the produced braking pressure is controlled. The tolerances in the conversion of the output force into deceleration or braking pressure are thus taken into account for the control of variable boosting, and compensated for. This means that the controller overrides the boosting which is caused by the pedal force alone, in case the nominal value As is in excess of the actual value $A_i$.

Preferably, the output quantity is the deceleration of the vehicle which is directly measurable by a deceleration sensor. The hydraulic pressure of the brake system which can be measured by a simple pressure sensor can also be used as an output quantity. Further possible output quantities are the lining displacement travel in the wheel brake, the contact force in the wheel brake, or any similar appropriate values.

It is intended to realize the controller on an electrical basis. An analog signal is preferred for the amplifying operation, however, a digital signal is also possible with suitable sensors.

BRIEF DESCRIPTION OF THE DRAWINGS

Further advantages of the present invention can be taken from the following description, making reference to the accompanying drawings. In the drawings.

DETAILED DESCRIPTION OF THE DRAWINGS

Figure 1:
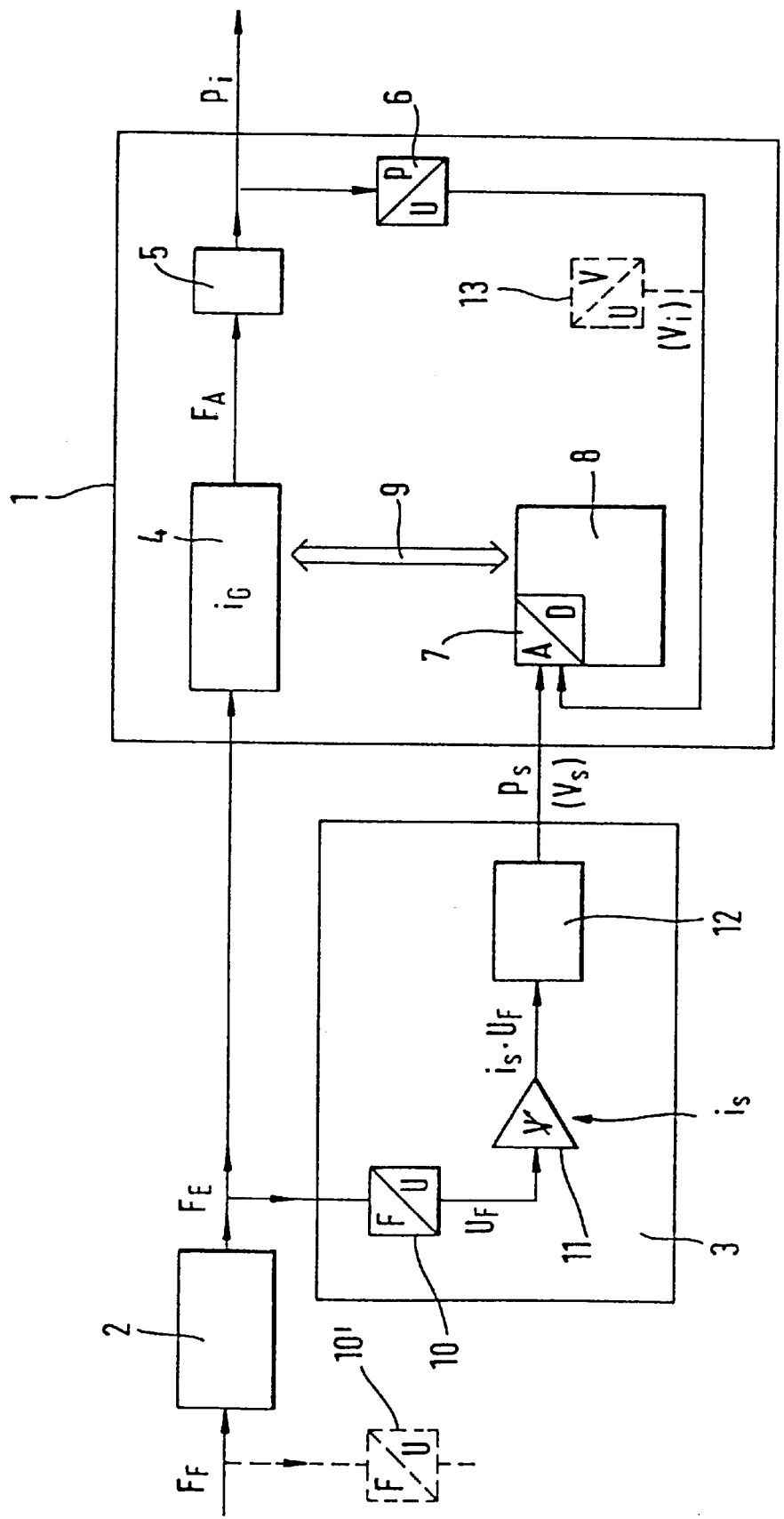
FIG. 1 is a schematic view of an embodiment according to the present invention.

FIG. 1 is a schematic view of a controlled, independently activatable brake power booster unit 1, a brake pedal 2, and a device 3 according to the present invention. A pedal force $F_F$ which is applied by the driver of the automotive vehicle to the brake pedal 2 is boosted by the transmission of the brake pedal 2 and supplied as an input force $F_E$ to the brake power booster 4.

Booster 4 boosts the input signal $F_E$ by the invariably adjusted boosting factor $i_G$ to achieve the output force $F_A$. The output force is applied to a tandem master cylinder 5 which generates a hydraulic pressure $P_i$ in the brake system.

A pressure sensor 6 converts the pressure $P_i$ into a voltage signal which is sent to the controller 8 by way of an analog-digital converter 7. Controller 8 compares the actual pressure $P_i$ with an externally predetermined nominal pressure value $P_s$ in order to control the brake power booster 4 by independent activation when a difference occurs. This pressure control is represented by arrow 9.

The device 3 has a force sensor 10, an amplifier 11 with a variably adjustable boosting factor is, and an electrical signal-adapting unit 12. The force sensor 10 converts the input force $F_E$ into a voltage signal $U_F$ which is amplified by the amplifier 11 by the externally predetermined nominal value $i_s$ of the boosting factor, and is converted into the nominal pressure value $p_s$ by the signal-adapting unit 12. The electronics incorporated in the device 3, comprising sensor means and signal processing means, enables the controlled, independently activatable brake power booster unit 1 as a component of the system for variable brake force boosting.

The brake power booster 4 is based on the concept of the vacuum brake power booster. Booster 4 performs the normal functions of a vacuum brake power booster, however, it is additionally capable of adjusting the hydraulic braking pressure $P_i$ corresponding to an external, electrical specification of nominal pressure $p_s$. A combination of normal pedal force application and independent activation is possible. The brake power booster 4 adjusts the higher pressure of the two specifications.

The constructively defined basic boosting $i_G$ is overridden by electronic independent activation in order to achieve variable boosting of the brake power booster. To this end, the driver pedal force $F_F$ is measured, either directly at the brake pedal 2 by the force sensor 10' (shown in dotted lines), or after the pedal force $F_F$ is boosted by the brake pedal 2 on the piston rod of the brake power booster 4 by means of a force sensor 10 (which is not specified in detail). A nominal pressure specification $P_s$ is generated from this quantity by way of the variable amplifier 11 and the electrical signal-adapting unit 12. The braking pressure $P_i$ which is produced from the driver pedal force $F_F$ and the basic boosting factor $i_G$ of the brake power booster can be overridden by this independent activation. This increase in the braking pressure $P_i$ by the independent activation has the same effect as an increase in the boosting factor $i_G$. The boosting factor $i_G$ can be amplified infinitely variably, and as desired, and with this concept by readjusting the electric amplifier 11 even during operation until the characteristic curve of the maximally attainable boosting force is reached. This will be explained in detail hereinbelow with respect to FIG. 2.

Figure 2:
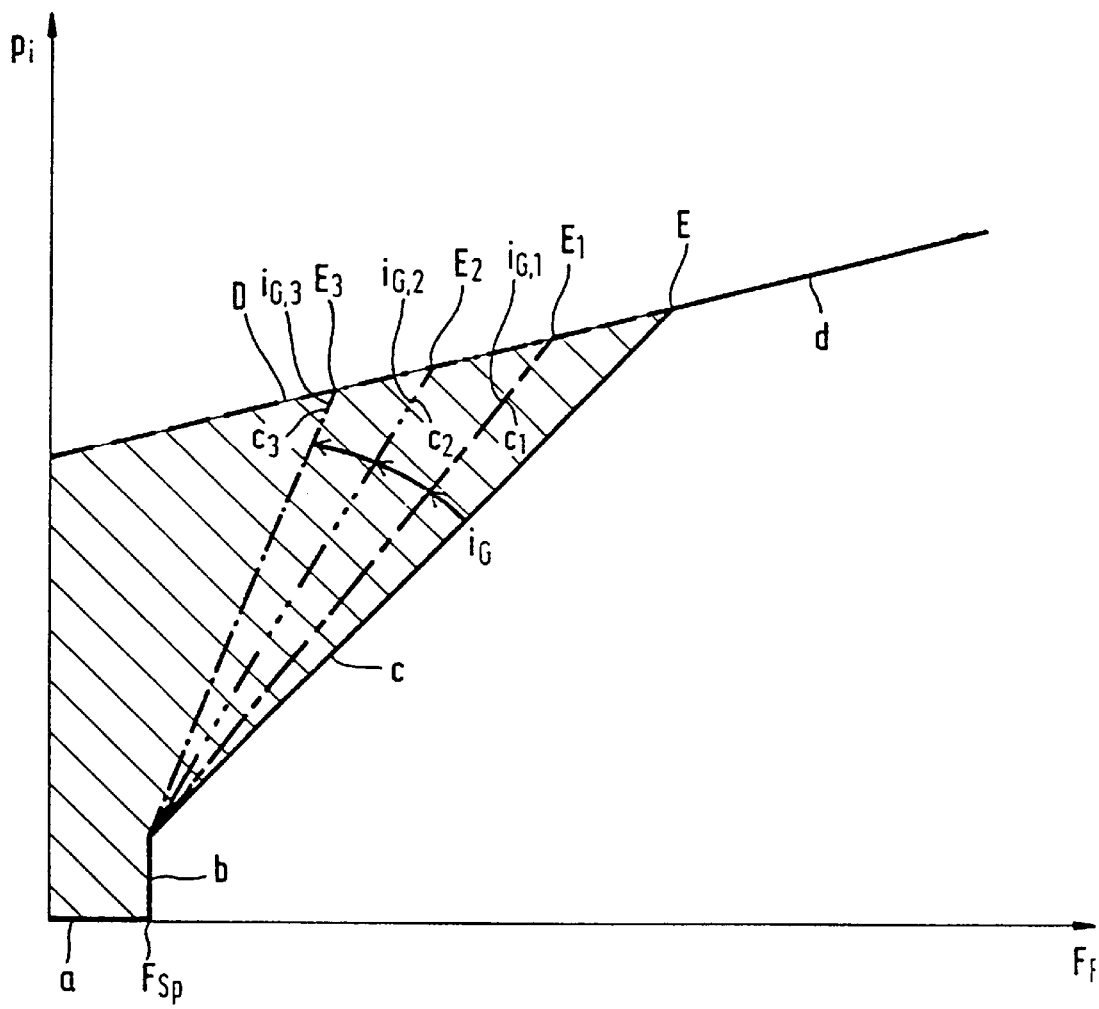
FIG. 2 is a pressure-force diagram $P_i (F_F)$

FIG. 2 shows a pressure-force diagram wherein the hydraulic pressure $p_i(F_F)$ is shown as a function of the pedal force $F_F$.

The solid line shows the characteristic curve of a normal brake power booster with an invariably predetermined basic boosting ratio $i_G$. In the zone 'a' of the curve, initially, no pressure increase occurs when the pedal force $F_F$ rises from zero. Pressure $P_i$ will greatly rise starting from a specific value $F_{Sp}$. This is illustrated in the zone 'b' of the characteristic curve, the socalled "jump-in" function range. In the zone 'c' of the characteristic curve, the pedal force $F_F$ is boosted by the invariably adjusted boosting factor $i_G$, until it passes into the maximum output line D in zone 'd'. Line D results from the maximum pressure which can be generated by the brake power booster and the pressure which corresponds to the respective pedal force $F_F$. The transition from the zone 'c' to the zone 'd' is the so-called operating point. E. When the basic boosting factor $i_G$ is increased, the zone 'c' will pass into one of the proportional zones, referred to by $c_1$, $c_2$ and $C_3$ and shown as an example, with correspondingly higher basic boosting values $i_{G,1}$, $i_{G,2}$ or $i_{G,3}$. The operating point $E_1$, $E_2$, or $E_3$ is shifted accordingly to the left.

A mere variation of the basic boosting factor $i_G$ of the brake power booster 4 covers only the zone bounded by the characteristic curves c and $C_3$ and the maximum output line D. The solution according to the present invention for adjusting a variable boosting factor $i_s$ of the brake power booster, however, provides more extensive possibilities of influencing the relationship between the pedal force $F_F$ and the braking pressure $P_i$. Amplifying is can be increased in excess of the value $i_G$ as desired, with the limitation, however, that the brake power booster 4, when independently activated, can increase the output force $F_A$ only until it reaches its operating point. This corresponds to the maximum output line D in FIG. 2.

The operating point E is determined by the construction of the brake power booster 4 and its driving source, i.e., by the vacuum available, as far as a vacuum brake power booster is concerned. Because an independent activation is always superimposed on the normal mechanical brake power booster function, the constructively predetermined basic boosting $i_G$ cannot remain under. The result is the operating range (shown in shaded lines in FIG. 2) wherein any characteristic curve can be realized by the electronics, i.e., by the specification of $i_s$. A simple electrical interface is provided because the boosting factor $i_G$ is adjusted by changing an electric amplification factor in this solution. Therefore, the disclosed device 3 is a universal component for all primary systems, for example, deceleration controllers, which must change the mechanical boosting of a brake power booster 4.

Instead of using the hydraulic pressure $P_i$ and a nominal pressure value $p_s$ for the control, corresponding actual and nominal deceleration values $V_i$ and $V_s$ may also be used. Instead of the pressure sensor 6, a deceleration sensor 13 must then be provided which is shown in dotted lines as an alternative in FIG. 1. The output signals $V_i$ of sensor 13 are sent to the controller 8. The device 3 is then required to provide a nominal deceleration value $V_s$ to the controller 8.

We claim:

1. A device for adjusting a variable boosting factor of a controlled, independently activatable brake power booster which boosts an input force and converts it into a hydraulic pressure of a brake system by way of a force-pressure converter and which can be controlled by independent activation by way of a controller adapted to adjust a nominal pressure value, wherein the device includes a force sensor for measuring the input force and generating a corresponding sensor output signal, a variable amplifier for amplifying the sensor output signal by the variable boosting factor and generating a corresponding amplifier output signal, and an electrical signal-adapting unit for generating a nominal pressure value from the amplifier output signal.

2. A device as claimed in claim 1, wherein the force-pressure converter is a master cylinder.

3. A device as claimed in claim 1, wherein the input force is proportional to a pedal force.

4. A method for adjusting a variable boosting factor of a controlled, independently activatable brake power booster, including the following method steps:

an input force is converted by the brake power booster into a boosted output quantity;

the output quantity is compared with a nominal value, a controller determines a corrective signal from the boosted output quantity and the nominal value, the corrective signal defines the magnitude of an independent activation of the brake power booster, wherein the magnitude of a signal representing the input force is measured, the measured signal is amplified by a variable boosting factor, the amplified signal is subjected to a control adaption, and the adapted signal is conducted as a nominal value to the controller.

5. A method as claimed in claim 4, wherein the output quantity is the deceleration of a vehicle and the nominal value is a nominal deceleration value.

6. A method as claimed in claim 4, wherein the output quantity is the hydraulic pressure in the brake system of the vehicle, and the nominal value is a nominal pressure value.

7. A method as claimed in claim 4, wherein the input force is converted into a signal.

8. A method as claimed in claim 4, wherein the input force is proportional to a pedal force applied by a driver.

* * * * *